Patented Nov. 9, 1948

2,453,671

UNITED STATES PATENT OFFICE 2,453,671

ALKAMINE ESTERS OF PYRROLE-3,4-DICARBOXYLIC ACIDS

Donald E. Sargent, Easton, Pa., assignor to American Cyanamid Company, New York, N. Y., a corporation of Maine No Drawing. Application November 13, 1946, Serial No. 709,406

6 Claims. (Cl. 260—313)

This invention relates to 1-cyclohexylpyrrole-3,4-dialkamine esters.

A number of esters of pyrrole carboxylic acids have been known, but the alkamine esters could not be produced by ordinary methods. It is with these esters that the present invention is concerned. They may be represented by the following formula:

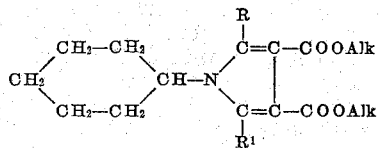

in which R and $R^1$ are hydrogen or alkyl, and Alk stands for dialkylaminoalkyl. The esters of the present invention are useful for a number of purposes such as activators for rubber accelerators and some exhibiting local anaesthetic power.

The esters of the present invention may be prepared by catalyzed alcoholysis of the corresponding alkyl esters, using an alkali metal alcoholate as the catalyst. The alkyl esters are in general prepared by known methods, notably by condensation of diacylsuccinates with cyclohexylamine. The simplest and most readily prepared compound is the ethyl ester of 2,5-dimethylpyrrole-3,4-carboxylic acid which is obtained by condensing diethyldiacetosuccinate with cyclohexylamine. The condensation of dialkyldiacetosuccinates with amines is a general reaction described by Knorr, Berichte, vol. 18, pages 299, et seq. In producing the cyclohexyl derivative cyclohexylamine is used in the Knorr reaction in place of the alkyl and aryl amines described. Other substituents in the 2,5 position may be prepared by using other diacylsuccinates such as dipropionosuccinates.

The alkamine esters of the present invention are obtainable in the form of the free bases or in the form of their salts, such as hydrochlorides. When used as local anaesthetics the latter form is preferred as it is in general more water soluble. The free bases, however, show greater effectiveness as activators for rubber accelerators.

The invention will be illustrated in greater detail in conjunction with the following specific examples which are typical illustrations. The parts are by weight and temperatures are uncorrected unless otherwise specified.

EXAMPLE 1

β-diethylaminoethyl-1-cyclohexyl-2,5-dimethylpyrrole-3,4-dicarboxylate

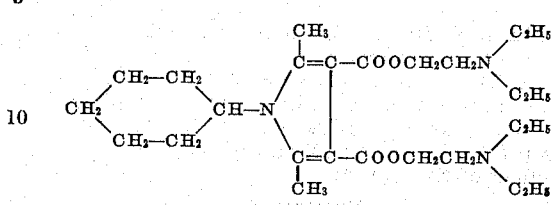

643 parts of diethyl-1-cyclohexyl-2,5-dimethylpyrrole-3,4-dicarboxylate (prepared by condensing diethyldiacetosuccinate with cyclohexylamine) are mixed with 1170 parts of β-diethylaminoethanol to which 10 parts of metallic sodium have been added. The reaction mixture is heated and ethyl alcohol begins to distill over between 78–85° C. After this fraction has distilled over the temperature gradually rises to 160° C. where excess β-diethylaminoethanol distills over. The pressure is then reduced and the remainder of the alcohol distilled off while keeping the reaction mixture at 100° C.

A residue is obtained in the form of a dark brown oil which is dissolved in 2500 parts of ether and washed twice with 1500 parts of water. The washed ether solution is then dried and the ether removed by evaporation under reduced pressure, whereupon the residual oil is fractionally distilled under reduced pressure, an orange-red product distilling over at 235–240° C. (corr.) under 5 mm. pressure. The ester is easily soluble in acetone, benzene and ethyl alcohol, moderately soluble in ether and insoluble in water. It has a refractive index of about 1.51.

The hydrochloride of the ester may be prepared by treating the ether extract with a solution of dry hydrogen chloride in anhydrous ether. The hydrochloride precipitates out and may be recovered by filtration.

When the process is carried out using the dimethyl-1-cyclohexyl-2,5-dimethylpyrrole-3,4-dicarboxylate instead of the ethyl ester, the same products are obtained and the reaction proceeds in the same manner except that the initial distillation temperature corresponds to the boiling point of methyl alcohol instead of ethyl alcohol.

EXAMPLE 2

β-diethylaminopropyl-1-cyclohexyl-2,5-dimethylpyrrole-3,4-dicarboxylate

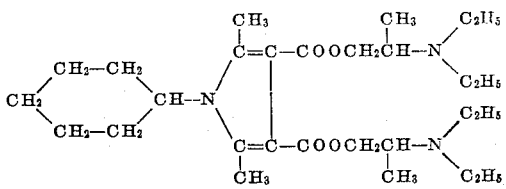

The procedure of Example 1 is followed but the β-diethylaminoethanol is replaced by an equivalent amount of β-diethylaminopropanol. The product is an oil having substantially the same characteristics as that of Example 1.

EXAMPLE 3

β-dimethylaminoethyl-1-cyclohexyl-2,5-dimethylpyrrole-3,4-dicarboxylate

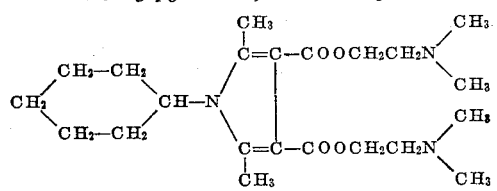

The procedure of Example 1 is followed but the β-diethylaminoethanol is replaced by an equivalent amount of β-dimethylaminoethanol. The product is an oil which cannot be distilled at atmospheric pressure without decomposition. Its properties are substantially the same as the product of Example 1.

EXAMPLE 4

γ-dipropylaminopropyl-1-cyclohexyl-2,5-dimethylpyrrole-3,4-dicarboxylate

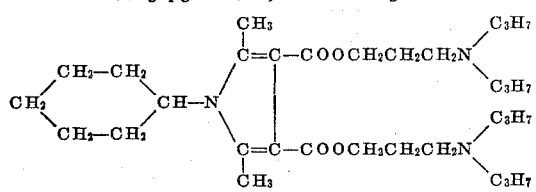

The procedure of Example 1 is followed using an equivalent amount of γ-dipropylaminopropanol instead of the β-diethylaminoethanol. A high boiling oil is obtained having substantially the same characteristics as the product of Example 2.

In the foregoing examples the catalyst sodium is added to the β-diethylaminoalkanol where it of course reacts to produce the alcoholate. The addition of the sodium is in no sense critical. It may be added to the reaction mixture, or it may be reacted either with the amino alcohol or with ordinary ethyl alcohol to form an alcoholate and the ready formed alcoholate added to the reaction mixture. The relative insensitiveness of the reaction to the method of addition of the sodium alcoholate and the smoothness of the reaction is in marked contrast to the ordinary characteristics of amino alcohols and their esters, which usually are sensitive to oxidation in alkaline solution. No reason is advanced here why the present reaction proceeds readily in spite of this normal tendency to side reactions.

The amount of alkali metal alcoholate present is not critical, but it should be in catalytic amounts, that is to say, amounts which are sufficient to vigorously catalyze the reaction but far below stoichiometric proportions. Good results are obtained with amounts of alcoholate of the order of $\frac{1}{10}$ mole per mole of the dicarbethoxypyrrole. This proportion is not critical and the term "catalytic amounts" will be used in the claims in its ordinary sense of small amounts far below stoichiometric proportions. Sodium can be replaced by potassium, but this presents no advantage in the reaction and therefore does not economically warrant the higher cost of potassium. For this economic reason the sodium alcoholate is preferred as the catalyst.

In many of the examples the hydrochlorides of the products are described. These salts are most readily prepared and where the product is of utility as a local anaesthetic are preferred because they are readily soluble in water. The esters, however, are capable of reacting with other strong acids to produce the corresponding salts.

This application is in part a continuation of my copending application Serial No. 496,959 filed July 31, 1943 now abandoned.

I claim:

1. Compounds selected from the group consisting of esters of 1-cyclohexyl pyrrole 3,4-dicarboxylic acids with dialkylamino alkanols and addition salts of the esters with strong acids.

2. Compounds selected from the group consisting of esters of 1-cyclohexyl-2,5-dialkylpyrrole 3,4-dicarboxylic acids with dialkylamino alkanols and addition salts of the esters with strong acids.

3. Compounds selected from the group consisting of esters of 1-cyclohexyl-2,5-dimethylpyrrole 3,4-dicarboxylic acids with dialkylamino alkanols and addition salts of the esters with strong acids.

4. A member of the group consisting of β-diethylaminoethyl - 1-cyclohexyl-2,5-dimethylpyrrole-3,4-dicarboxylate having the following formula:

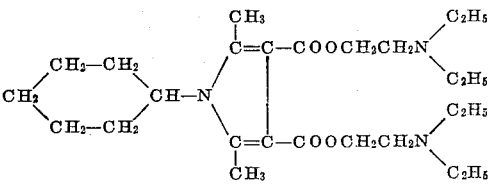

and its addition salts with strong acids.

5. A method of preparing a dialkamine ester of a 1 - cyclohexylpyrrole - 3,4 - dicarboxylic acid, which comprises heating a dialkyl ester of the corresponding 1-cyclohexyl pyrrole-3,4-dicarboxylic acid with the desired dialkylamino alkanol in the presence of catalytic amounts of an alkali metal alcoholate.

6. A method of preparing alkamine esters of 1-cyclohexyl-2,5-dimethylpyrrole-3,4 - dicarboxylic acids, which comprises heating a dialkyl ester of 1-cyclohexyl - 2,5-dimethylpyrrole-3,4-dicarboxylic acid with the desired dialkylamino alkanol in the presence of catalytic amounts of an alkali metal alcoholate.

DONALD E. SARGENT.

No references cited.